(12) United States Patent
Yokota

(10) Patent No.: US 8,818,377 B2
(45) Date of Patent: *Aug. 26, 2014

(54) RADIO TERMINAL, INFORMATION PROCESSING DEVICE, INFORMATION PROCESSING PROGRAM, AND INFORMATION PROCESSING METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 300 days.

This patent is subject to a terminal disclaimer.

(21) Appl. No.: 12/675,762

(22) PCT Filed: Aug. 27, 2008

(86) PCT No.: PCT/JP2008/065339
§ 371 (c)(1),
(2), (4) Date: Jul. 13, 2010

(87) PCT Pub. No.: WO2009/028574
PCT Pub. Date: Mar. 5, 2009

(65) Prior Publication Data
US 2010/0297996 A1    Nov. 25, 2010

(30) Foreign Application Priority Data

Aug. 28, 2007 (JP) .................................. 2007-221880

(51) Int. Cl.
*H04W 36/00* (2009.01)

(52) U.S. Cl.
USPC ........... 455/437; 455/436; 455/438; 455/439; 455/440; 455/441; 370/331; 370/332; 370/333; 370/334; 379/205; 379/235; 379/227; 379/250

(58) Field of Classification Search
USPC .......... 455/67.13, 115.1, 127.4, 414.2, 422.1, 455/436–443, 444, 454, 552.1, 553.1; 370/252, 278, 319, 320, 328, 331–334, 370/352, 412, 466–470; 709/205, 235, 227, 709/250
See application file for complete search history.

(56) References Cited

U.S. PATENT DOCUMENTS

2002/0082017 A1* 6/2002 Hattori ......................... 455/436
2004/0097230 A1* 5/2004 Natarajan et al. ............. 455/436

(Continued)

FOREIGN PATENT DOCUMENTS

EP    1482752 A1    12/2004
JP    2002-499428    7/2000

(Continued)

OTHER PUBLICATIONS

IEEE P802.21/D13: Draft Standard for Local and Metropolitan Area Networks: Media Independent Handover Services, Published in Jul. 2008.*
The Notice of Preliminary Rejection (English translation) for KR 10-2010-7005194, mailed Jun. 8, 2011, 11 pages.

(Continued)

*Primary Examiner* — Justin Lee
(74) *Attorney, Agent, or Firm* — Duane Morris LLP

(57) ABSTRACT

A radio terminal (10) includes an MIH user (14) configured to manage mobility from the first network to the second network; and an MIH function unit (13) configured to control a handover from the first network to the second network. The MIH user (14) notifies a link controller (12) via the MIH function unit (13) of a condition setting request including a first judgment logical formula being a condition to start an establishment of a radio link with the second network and a second judgment logical formula being a condition to execute a handover from the first network to the second network. The first judgment logical formula and the second judgment logical formula each indicate a combination of thresholds to be satisfied by a plurality of respective link is parameters in the radio link established with the first network.

6 Claims, 6 Drawing Sheets

(56) References Cited

U.S. PATENT DOCUMENTS

| | | | |
|---|---|---|---|
| 2004/0203792 A1* | 10/2004 | Shaheen et al. | 455/444 |
| 2006/0140150 A1* | 6/2006 | Olvera-Hernandez et al. | 370/331 |
| 2006/0221899 A1* | 10/2006 | Feder et al. | 370/331 |
| 2006/0258355 A1* | 11/2006 | Olvera-Hernandez et al. | 455/436 |
| 2006/0268782 A1* | 11/2006 | Kwak et al. | 370/331 |
| 2008/0198804 A1* | 8/2008 | Rahman et al. | 370/331 |
| 2008/0233958 A1* | 9/2008 | Robbins et al. | 455/436 |
| 2008/0244095 A1* | 10/2008 | Vos et al. | 709/250 |
| 2008/0304454 A1* | 12/2008 | Zhong et al. | 370/331 |
| 2009/0061876 A1* | 3/2009 | Ho et al. | 455/436 |
| 2009/0161629 A1* | 6/2009 | Purkayastha et al. | 370/331 |
| 2010/0208705 A1* | 8/2010 | Yokota | 370/332 |

FOREIGN PATENT DOCUMENTS

| | | | |
|---|---|---|---|
| JP | 2002-199428 | | 7/2002 |
| WO | WO-2006/052563 | A2 | 5/2006 |
| WO | WO-2007/016964 | A1 | 2/2007 |

OTHER PUBLICATIONS

Guo, "Suggestion about link parameter threshold configuration: LB Issue—™58: Comment 804," IEEE 802.21 MIHS (Sep. 13, 2006).
International Search Report for PCT/JP2008/065339, mailed Nov. 25, 2008, 2 pages.
Joint Harmonized Contribution, "Media Independent Handover," IEEE 802.21 Media Independent Handover Services (May 17, 2005).
LAN MAN Standards Committee of the IEEE Computer Society, "Draft Standard for Local and Metropolitan Area Networks: Media Independent Handover Services," IEEE P802.21/D04.00 (Feb. 2007).
Notification of Reason(s) for Refusal for Japanese Patent Application No. 2007-221880, mailed May 29, 2012, 6 pages (including English translation).
JP2007221880 Office Action dated Aug. 28, 2012.
LAN MAN Standards Committee, "Draft Standard for Local and Metropolitan Area Networks: Media Independent Handover Services," IEEE, Aug. 2007, P802(21)(D7.1), 339 pages.
Extended European Search Report dated Oct. 14, 2013, from European Patent Application No. 08828133.2, 10 pages.
Supplementary European Search Report dated Oct. 31, 2013, from European Patent Application No. 08828133.2, 1 page.

* cited by examiner

FIG.3

| | FIRST NETWORK (e.g. CDMA 1x EV-DO) | SECOND NETWORK (e.g. IEEE 802.16e) | THIRD NETWORK (e.g. WLAN) |
|---|---|---|---|
| LINK PARAMETER | { SINR, RSSI, DRC, Tx_Power, DRC_Lock } | { SINR, RSSI, Successful ratio of DL-MAP receive, Rate, Uplink Modulation class, Tx_Power } | { CIR, RSSI, PER, Rate } |
| THRESHOLD (Initiate Action) | { 0dB, -80dBm, 6, 15dBm, 0.8 } | { 3dB, -70dBm, 0.9, 500kbps, QPSK 3/4, 15dBm } | { 3dB, -75dBm, 0.1, 500kbps } |
| THRESHOLD (Execute Action) | { -5dB, -90dBm, 4, 23dBm, 0.8 } | { -2dB, -80dBm, 0.8, 200kbps, QPSK 1/2, 23dBm } | { 0dB, -85dBm, 0.1, 500kbps } |
| FIRST JUDGMENT LOGICAL FORMULA (Initiate Action) | ( SINR & RSSI & DRC ) ∥ ( Tx_Power & DRC_Lock ) | ( SINR & RSSI & Successful ratio of DL-MAP receive ) ∥ ( Tx_Power & Uplink Modulation class ) | ( CIR & PER ) ∣ RSSI |
| SECOND JUDGMENT LOGICAL FORMULA (Execute Action) | ( SINR & RSSI & DRC ) ∥ ( Tx_Power & DRC_Lock ) | ( SINR & RSSI & Successful ratio of DL-MAP receive ) ∥ ( Tx_Power & Uplink Modulation class ) | ( CIR & PER ) ∣ RSSI |

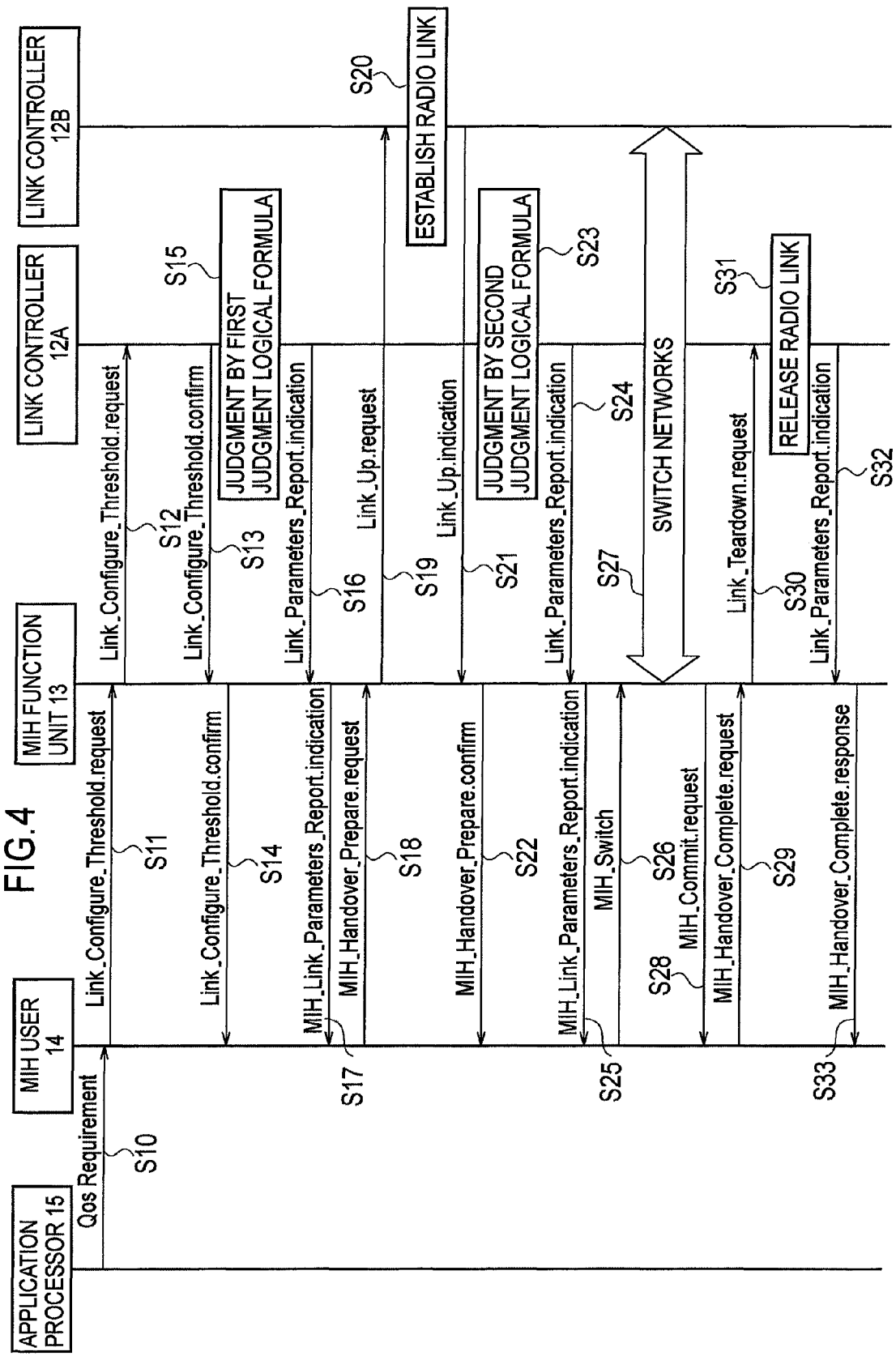

FIG.5

| Name | Type | Description |
|---|---|---|
| LINK PARAMETER TYPE (Link Parameter Type) | A pair of { Link Type:Parameter Type } Examples: {Generic:SINR}, {Generic:RSSI}, {EV-DO:DRC}, {EV-DO:Tx_Power}, {EV-DO:DRC_Lock}, | LINK PARAMETERS FOR EACH OF WHICH THRESHOLD IS SET |
| FIRST THRESHOLD (Initiate Action Threshold) | THRESHOLD SET FOR EACH LINK PARAMETER | USED TO JUDGE WHETHER TO START PREPARATION FOR HANDOVER (Initiation Action) |
| THIRD THRESHOLD (Rollback Action Threshold) | THRESHOLD SET FOR EACH LINK PARAMETER | USED TO JUDGE WHETHER TO CANCEL PREPARATION FOR HANDOVER (Initiation Action) |
| SECOND THRESHOLD (Execute Action Threshold) | THRESHOLD SET FOR EACH LINK PARAMETER | USED TO JUDGE WHETHER TO START EXECUTION OF HANDOVER (Execute Action) |
| FIRST JUDGMENT LOGICAL FORMULA | FORMULA REGARDING PREPARATION FOR HANDOVER (Initiation Action) | WHEN FIRST JUDGMENT LOGICAL FORMULA IS SATISFIED, MIH FUNCTION UNIT IS NOTIFIED OF "Link_Parameters_Report_indication" |
| SECOND JUDGMENT LOGICAL FORMULA | FORMULA REGARDING EXECUTION OF HANDOVER (Execute Action) | WHEN SECOND JUDGMENT LOGICAL FORMULA IS SATISFIED, MIH FUNCTION UNIT IS NOTIFIED OF "Link_Parameters_Report_indication" |
| INTERVAL FOR JUDGMENT (Interval for judgment) | TIMING FOR JUDGMENT (Interval time) | INDICATES INTERVAL FOR JUDGMENT USING JUDGMENT LOGICAL FORMULA |

FIG.6

| Name | Type | Description |
|---|---|---|
| OLD LINK PARAMETER VALUE | VALUE OF EACH LINK PARAMETER | VALUE OF OLD LINK PARAMETER |
| NEW LINK PARAMETER VALUE | VALUE OF EACH LINK PARAMETER | VALUE OF NEW LINK PARAMETER |
| OPERATION TYPE | INTEGER | 1: PREPARATION FOR HANDOVER (Initiation Action)<br>2: EXECUTION OF HANDOVER (Execute Action) |
| JUDGMENT LOGICAL FORMULA | JUDGMENT LOGICAL FORMULA | LOGICAL FORMULA USED FOR QoS JUDGMENT |

RADIO TERMINAL, INFORMATION PROCESSING DEVICE, INFORMATION PROCESSING PROGRAM, AND INFORMATION PROCESSING METHOD

CROSS-REFERENCE TO RELATED APPLICATIONS

This is a U.S. National Phase Application of International Application No. PCT/JP2008/065339 filed Aug. 27, 2008, which claims priority to Japanese Patent Application No. 2007-221880 filed Aug. 28, 2007, the disclosures of which are incorporated herein by reference in their entirety.

TECHNICAL FIELD

The present invention relates to a radio terminal, an information processing device, an information processing program, and an information processing method for performing a handover from a first network to a second network employing a radio communication scheme different from that of the first is network.

BACKGROUND ART

There has heretofore been known a radio terminal connectable to multiple networks employing different radio communication schemes (including "1×EV-DO" in compliance with CDMA2000 and "WiMAX" in compliance with IEEE802.16e, for example).

The radio terminal includes a mobility manager (MIH user; Media Independent Handover User) configured to manage mobility between the multiple networks, and multiple link controllers each configured to control a radio link established between its own terminal and the corresponding network. Moreover, there is a proposal to provide a handover controller (MIHF; Media Independent Handover Function) which is provided between the mobility manager and the multiple link controllers, and which is configured to control handovers between the multiple networks (Non-patent Document 1, for example).

To be more precise, the mobility manager notifies the handover controller of types (SINR, RSSI, DRC, Tx_Power, and DRC_Lock, for example) of multiple link parameters and information (MIH_Configure.request) indicating multiple thresholds set for each of the link parameters. Here, the thresholds include a first threshold (Initiate Action Threshold) for judging whether or not to perform preparation for a handover (Initiation Action), a second threshold (Execute Action Threshold) for judging whether or not to execute the handover is (Execute Action), and a third threshold (Rollback Action Threshold) for judging whether or not to cancel the preparation for the handover (Rollback Action).

The handover controller notifies the link controller controlling a radio link already established, of information (Link_Configure_Threshold.request) indicating the types of the multiple link parameters and the multiple thresholds set for each of the link parameters.

When a link parameter value becomes worse than the first threshold, the link controller notifies the handover controller of information (Link_Parameters_Report.indication) indicating the link parameter value. The handover controller notifies the mobility manager of information (MIH_Link_Parameters_Report.indication) indicating the link parameter value.

Based on this notice, the mobility manager instructs preparation of a handover, i.e., an establishment of a radio link which is yet to be established.

Subsequently, when the link parameter value becomes worse than the second threshold (which is a value representing a situation where a radio environment is worse than that of the first threshold), the link controller notifies the handover controller of the information (Link_Parameters_Report.indication) indicating the link parameter value. The handover controller notifies the mobility is manager of the information (MIH_Link_Parameters_Report.indication) indicating the link parameter values.

Based on this notice, the mobility manager instructs execution of the handover, i.e., switching of the networks to which the radio terminal is connected.

In the meantime, when the link parameter value becomes better than the third threshold, the link controller notifies the handover controller of the information (Link_Parameters_Report.indication) indicating the link parameter value. The handover controller instructs cancellation of the preparation for the handover (Initiation Action).

As described above, since the link controller only has to perform threshold judgment, a process load on the link controller is reduced.

Non-patent Document 1: IEEE802.21 Draft Standard (P802.21/DO4.00)

DISCLOSURE OF THE INVENTION

According to the above-described background art, for each of the individual link parameters, when the link parameter value becomes worse than any of the thresholds (the first threshold and the second threshold), the link controller simply notifies the handover controller of the information (Link_Parameters_Report.indication) indicating the link is parameter value.

Accordingly, when the link parameter value (the radio environment) is changed within a period from the preparation for the handover (Initiation Action) to the execution of the handover, the handover controller is frequently notified of the information (Link_Parameters_Report.indication) indicating the link parameter value. In other words, a process load on the handover controller is increased.

In the meantime, in order to prevent frequent cancellation of the preparation for the handover (Initiation Action), it is not preferable to set the third threshold to a value equal to the first threshold. Therefore, in order to provide a hysteresis, it is a general practice to set the third threshold to a value representing a situation where the radio environment is better than that of the first threshold.

Accordingly, even if the link parameter actually becomes better than the first threshold, the preparation for the handover (Initiation Action) may not be cancelled in some cases depending on transmission timing of the information (Link_Parameters_Report.indication) indicating the link parameter value. In other words, even if the link parameter value is actually recovered, the handover may be executed (Execute Action) as a result of erroneous judgment.

Therefore, it is an objective of the present invention to provide a radio terminal, an information processing device, an is information processing program, and an information processing method, which are capable of reducing messages from a link controller to a handover controller and preventing erroneous judgment of a handover.

In one characteristic of the present invention, a radio terminal configured to perform a handover from a first network to a second network employing a radio communication scheme different from that of the first network, comprises: a first link controller (for example, link controller 12A) configured to establish a radio link with the first network; a second link controller (for example, link controller 12B) configured to establish a radio link with the second network; a mobility manager (MIH user 14) configured to manage mobility from the first network to the second network; and a handover controller (MIH function unit 13) configured to control the handover from the first network to the second network, wherein the mobility manager notifies the handover controller of a condition setting request including a first condition being a condition to start an establishment of a radio link with the second network and a second condition being a condition to execute a handover from the first network to the second network, the handover controller notifies the first link controller of the condition setting request received from the mobility manager, the first condition indicates a combination of thresholds to be satisfied by a plurality of respective link parameters in the radio link established with the first network, and the second condition indicates a combination of thresholds to be satisfied by the plurality of respective link parameters in the radio link established with the first network.

According to this aspect, the handover controller notifies the first link controller of the first condition and the second condition representing the combinations of the thresholds to be satisfied by the respective multiple link parameters.

Therefore, the first link controller does not have to notify the handover controller of the information indicating the link parameter value every time any of the individual link parameters exceed the corresponding threshold, thereby reducing messages from the first link controller to the handover controller.

Moreover, since the first link controller knows the combinations of the thresholds to be satisfied by the respective multiple link parameters, it is possible to perform a handover operation properly without depending upon transmission timing of the information indicating the link parameter values and thereby to prevent erroneous judgment of handovers.

In the aforementioned characteristic, the condition setting request may include: an interval for judging whether or not the first condition is satisfied; and an interval for judging whether or not the second condition is satisfied.

In one characteristic of the present invention, an m information processing device comprises: a mobility manager configured to manage mobility from a first network to a second network employing a radio communication scheme different from that of the first network; and a handover controller configured to control a handover from the first network to the second network, is wherein the mobility manager notifies the handover controller of a condition setting request including a first condition being a condition to start an establishment of a radio link with the second network and a second condition being a condition to execute a handover from the first network to the second network, the handover controller notifies the first link controller configured to establish a radio link with the first network, of the condition setting request received from the mobility manager, the first condition indicates a combination of thresholds to be satisfied by a plurality of respective link parameters in the radio link established with the first network, and the second condition indicates a combination of thresholds to be satisfied by the plurality of respective link parameters in the radio link established with the first network.

In one characteristic of the present invention, an information processing program to be applied to an information processing apparatus including a mobility manager configured to manage mobility from a first network to a second network employing a radio communication scheme different from that of the first network, and a handover controller configured to control a handover from the first network to the second network, the program causing a computer to execute the steps of : notifying, from the mobility manager to the handover controller, of a condition setting request including a first condition being a condition to start an establishment of a radio link with the second network and a second condition being a condition to execute a handover from the first network to the second network; and notifying, from the handover controller to the first link controller configured is to establish a radio link with the first network, of the condition setting request received from the mobility manager, wherein the first condition indicates a combination of thresholds to be satisfied by a plurality of respective link parameters in the radio link established with the first network, and the second condition indicates a combination of thresholds to be satisfied by the plurality of respective link parameters in the radio link established with the first network.

In one characteristic of the present invention, an information processing method used in an information processing device including an MIH user configured to manage mobility from a first network to a second network employing a radio communication scheme different from that of the first network, and an MIH function unit configured to control a handover from the first network to the second network, the information processing method comprising the steps of: notifying, from the MIH user to the MIH function unit, of Link_Configure_Threshold.request including a first condition being a condition to start an establishment of a radio link with the second network and a second condition being a condition to execute the handover from the first network to the second network; and notifying, from the MIH function unit to a first link controller configured to establish a radio link with the first network, of the Link_Configure_Threshold.request received from the MIH user, wherein the first condition indicates a combination of thresholds to be satisfied by a plurality of respective link parameters in the radio link established with the first network, and the second condition indicates a combination of thresholds to be satisfied by the plurality of respective link parameters in the radio link established with the first network.

According to the aspects of the present invention, it is possible to provide a radio terminal, an information processing device, an information processing program, and an information processing method, which are capable of reducing messages from a link controller to a handover controller and preventing erroneous judgment of handovers.

BRIEF DESCRIPTION OF THE DRAWINGS

FIG. 3 is a view showing information to be managed by an MIH function unit 13 according to the embodiment of the present invention.

FIG. 4 is a sequence diagram showing operations of the communication system according to the embodiment of the present invention.

FIG. 5 is a view showing an example of Link_Configure_Threshold.request according to the embodiment of the present invention.

FIG. 6 is a view showing an example of Link_Parameters_Report.indication according to the embodiment is of the present invention.

BEST MODES FOR CARRYING OUT THE INVENTION

Figure 1:
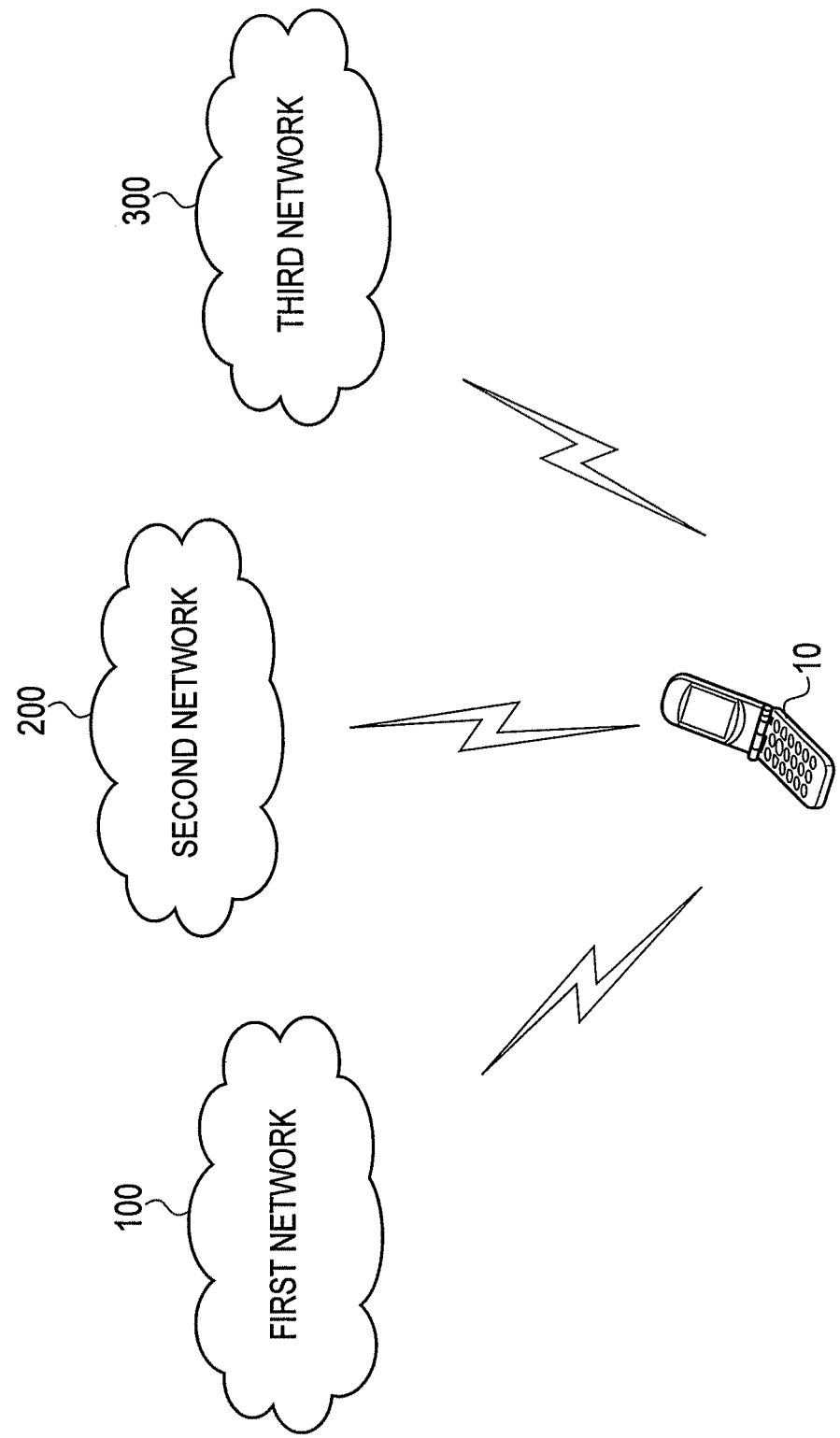
FIG. 1 is a view showing a configuration of a communication system according to an embodiment of the present invention.

An embodiment of the present invention will be described below. Throughout the drawings, identical or similar constituents are designated by identical or similar reference numerals. It is to be noted, however, that the drawings are merely schematic and proportions of respective dimensions and the like may be different from actual ones.

It is therefore to be understood that the actual dimensions and the like should be judged in consideration of the following description. Moreover, it is needless to say that dimensional relations and proportions are different from one drawing to another in some part.

(Configuration of Communication System)

Now, a configuration of a communication system according to the embodiment will be described below with reference to the accompanying drawing. FIG. 1 is a view showing a configuration of the communication system according to the embodiment.

As shown in FIG. 1, the communication system includes a radio terminal 10 and multiple networks (a first network 100 to a third network 300).

The radio terminal 10 is a terminal configured capable of performing radio communication with multiple networks. Note that, details of the radio terminal 10 will be described later.

The multiple networks are networks employing different radio communication schemes (configurations of physical layers or link layers). For example, the first network 100 is a network employing "1×EV-DO" in compliance with CDMA2000. The second network 200 is a network employing "WiMAX" in compliance with IEEE802.16e. The third network 300 is a network employing "WLAN" in compliance with IEEE802.11.

(Configuration of Radio Terminal)

Figure 2:
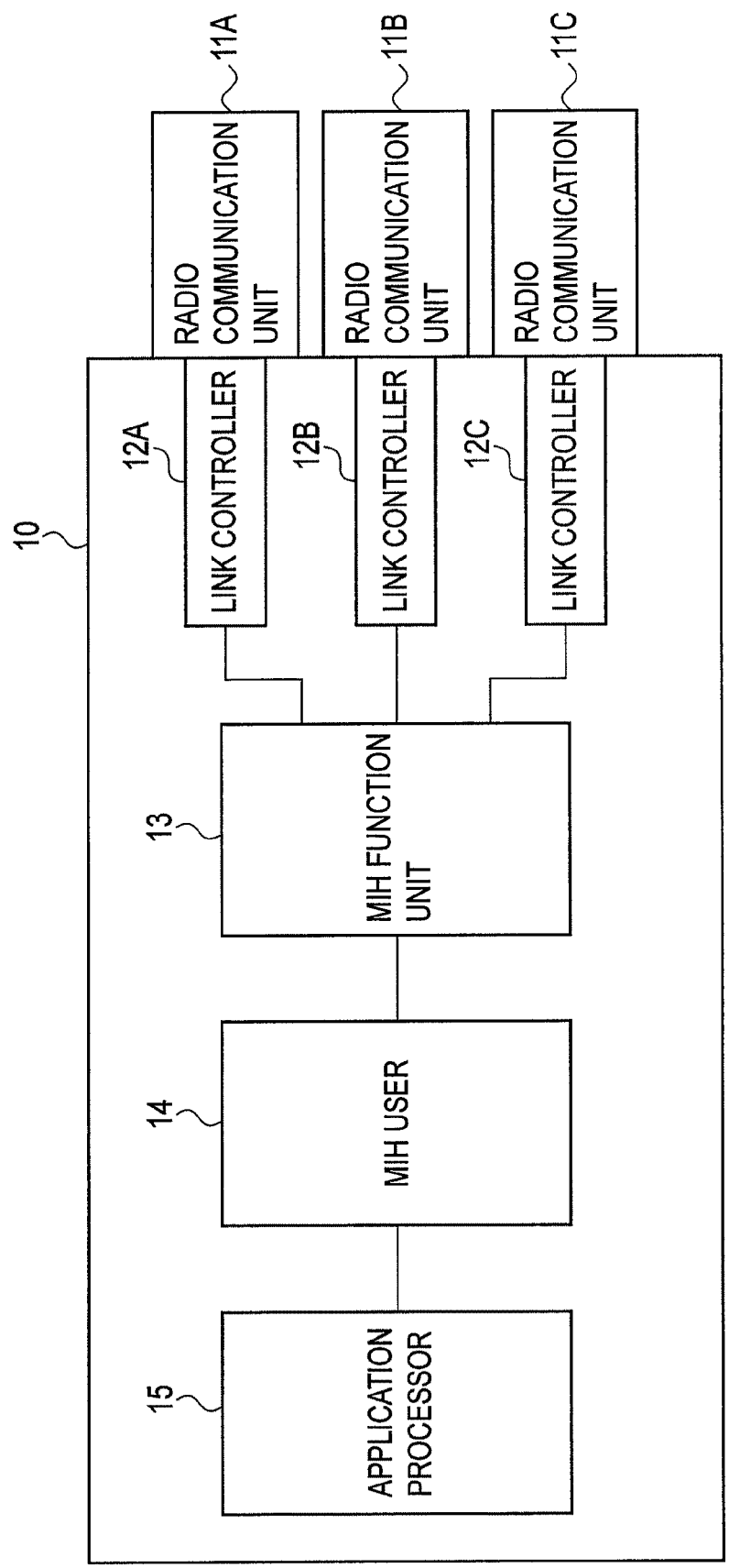
FIG. 2 is a block diagram showing a configuration of a radio terminal 10 according to the embodiment of the present invention.

In the following, a configuration of the radio terminal 10 according to the embodiment will be described with reference to the accompanying drawing. FIG. 2 is a block diagram showing a configuration of the radio terminal 10 according to the embodiment.

As shown in FIG. 2, the radio terminal 10 includes multiple radio communication units 11 (a radio communication unit 11A to a radio communication unit 11C), multiple link controllers 12 (a link controller 12A to a link controller 12C), an MIH function unit 13, an MIH user 14, and an application processor 15.

The radio communication units 11 each establish a physical radio connection in the physical layer with the corresponding network, in response to an instruction from a higher layer (such as the application processor 15).

To be more precise, the radio communication unit 11A establishes the physical radio connection corresponding to the "1×EV-DO" with the first network 100. The radio communication unit 11B establishes the physical radio connection corresponding to the "WiMAX" with the second network 200. The radio communication unit 11C establishes the physical radio connection corresponding to the "WLAN" with the third network 300.

The link controllers 12 each establish a radio link in the link layer with the corresponding network, in response to an instruction from the higher layer (such as the application processor 15). The link controller 12 monitors various link parameters in the radio link established with the corresponding network.

To be more precise, the link controller 12A has a function as an interface (a device driver) with the radio communication unit 11A and establishes the radio link corresponding to the "1×EV-DO" with the first network 100. The link controller 12B has a function as an interface (a device driver) with the radio communication unit 11B and establishes the radio link corresponding to the "WiMAX" with the second network 200. The link controller 12C has a function as an interface (a device driver) with the radio communication unit 11C and establishes the radio link corresponding to the "WLAN" with the third network 300.

The MIH function unit 13 is a handover controller configured to control handovers between the networks in response to an instruction from the MIH user 14 which functions as a layer higher than the MIH function unit 13. The MIH function unit 13 is a media-independent handover function not depending on the configuration of the physical layer, and is defined in IEEE802.21.

The MIH user 14 is a mobility manager configured to manage mobility between the networks in response to an instruction from the application processor 15 functioning as a layer higher than the MIH user 14. The MIH user 14 functions as a layer higher than the MIH function unit 13.

The application processor 15 functions as a layer higher than the MIH user 14 and processes various applications and the like.

Here, as shown in FIG. 3, the MIH user 14 manages various conditions used to perform a handover in the network to which the own terminal is connected. To be more precise, for each of the networks, the MIH user 14 manages the types of the link parameters, first thresholds (Initiate Action Threshold), second thresholds (Execute Action Threshold), a first judgment logical formula, and a second judgment logical formula.

The type of each link parameter indicates a link parameter to be monitored in the radio link established with the network to which the own terminal is connected.

For example, when the network to which the own terminal is connected is the first network 100, the link parameters shown below are monitored, by the link controller 12A, in the radio link established with the first network 100.

(a) Signal to Interference plus Noise Ratio (SINR)
(b) Received Signal Strength Indication (RSSI)
(c) DRC (Data Rate Control)
(d) Transmission Power (Tx_Power)
(e) Proportion in which a radio base station normally receives DRC transmitted from a radio terminal (DRC_Lock)

When the network to which the own terminal is connected is the second network 200, the link parameters shown below are monitored, by the link controller 12B, in the radio link established with the second network 200.

(a) Signal to Interference plus Noise Ratio (SINR)
(b) Received Signal Strength Indication (RSSI)
(c) Success Rate of DL-MAP Reception
(d) Transfer Rate (Rate)
(e) Uplink Modulation Class
(f) Transmission Power (Tx_Power)

When the network to which the own terminal is connected is the third network 300, the link parameters shown below are monitored, by the link controller 12C, in the radio link established with the third network 300.

(a) Carrier to Interference Ratio (CIR)
(b) Received Signal Strength Indication (RSSI)
(c) Packet Error Rate (PER)
(d) Transfer Rate (Rate)

The first thresholds (Initiate Action Threshold) are the thresholds set for the respective link parameters in order to judge whether or not to perform preparation for a handover (Initiation Action). Here, the preparation for the handover is an operation (Initiation Action) to establish a radio link with a certain network in a case where a radio link is established with a different network.

For example, when the network to which the own terminal is connected is the first network 100, the threshold set for the signal to interface plus noise ratio (SINR) is "0 dB". Similarly, "−80 dBm", "6", "15 dBm", and "0.8" are set for the rest of the link parameters.

When the network to which the own terminal is connected is the second network 200, the threshold set for the signal to interface plus noise ratio (SINR) is "3 dB". Similarly, "−70 dBm", "0.9", "500 kbps", "QPSK ¾", and "15 dBm" are set for the rest of the link parameters.

When the network to which the own terminal is connected is the third network 300, the threshold set for the carrier to interface ratio (CIR) is "3 dB". Similarly, "−75 dBm", "0.1", and "500 kbps" are set for the rest of the link parameters.

The second thresholds (Execute Action Threshold) are the thresholds set for the respective link parameters in order to judge whether or not to perform execution for the handover (Execute Action). Here, the execution for the handover (Execute Action) is an operation to switch the networks to which the own terminal is connected in the case where the radio links are established with the certain network and the different network. Here, values representing a situation where a radio environment is worse than that of the first thresholds (Initiate Action Threshold) are set for the second thresholds (Execute Action Threshold).

For example, when the network to which the own terminal is connected is the first network 100, the threshold set for the signal to interface plus noise ratio (SINR) is "−5 dB". Similarly, "−90 dBm", "4", "23 dBm", and "0.8" are set for the rest of the link parameters.

When the network to which the own terminal is connected is the second network 200, the threshold set for the signal to interface plus noise ratio (SINR) is "−2 dB". Similarly, "−80 dBm", "0.8", "200 kbps", "QPSK ½", and "23 dBm" are set for the rest of the link parameters.

When the network to which the own terminal is connected is the third network 300, the threshold set for the carrier to interface ratio (CIR) is "0 dB". Similarly, "−85 dBm", "0.1", and "500 kbps" are set for the rest of the link parameters.

The first judgment logical formula is a condition (a first condition) for performing the preparation for the handover (Initiation Action). To be more precise, the first judgment logical formula indicates a combination of the thresholds to be satisfied by the respective multiple link parameters in the radio link established with the network to which the own terminal is connected.

For example, when the network to which the own terminal is connected is the first network 100, the preparation for the handover (Initiation Action) is performed if any of the following conditions is satisfied.

(a) All of the SINR, the RSSI, and the DRC become worse than the first thresholds mentioned above (b) All of the Tx_Power and the DRC_Lock become worse than the first thresholds mentioned above When the network to which the own terminal is connected is the second network 200, the preparation for the handover (Initiation Action) is performed if any of the following conditions is satisfied.

(a) All of the SINR, the RSSI, and the Successful ratio of DL-MAP Receive become worse than the first thresholds mentioned above (b) All of the Tx_Power and the uplink modulation class become worse (lower) than the first thresholds mentioned above When the network to which the own terminal is connected is the third network 300, the preparation for the handover (Initiation Action) is performed if any of the following conditions is satisfied.

(a) All of the CIR and the PER become worse than the first thresholds mentioned above (b) The RSSI becomes worse than the first threshold mentioned above The second judgment logical formula is a condition (a second condition) for performing the execution for the handover (Execute Action). To be more precise, the second judgment logical formula indicates a combination of the thresholds to be satisfied by the respective multiple link parameters in the radio link established with the network to which the own terminal is connected.

In the embodiment, the first judgment logical formula and the second judgment logical formula have the same combination of the thresholds to be satisfied by the respective link parameters. Note, however, that the invention is not limited to this. Specifically, the combination of the thresholds to be satisfied by the link parameters may be different between the first judgment logical formula and the second judgment logical formula.

(Operations of Communication System)

In the following, operations of the communication system according to the embodiment will be described with reference to the accompanying drawings. FIG. 4 is a sequence diagram showing operations of the communication system according to the embodiment. It is to be noted that FIG. 4 describes an operation of a handover from the first network 100 to the second network 200 as an example.

As shown in FIG. 4, in step 10, the application processor 15 notifies the MIH user 14 of service quality (QoS Requirement) required for a new application.

In step 11, through the MIH function unit 13, the MIH user 14 notifies the link controller 12A of a condition setting request (Link_Configure_Threshold.request) that requests setting of conditions for the handover from the first network 100 to the second network 200.

The condition setting request (Link_Configure_Threshold.request) at least includes the condition (the first condition) for performing the preparation for the handover (Initiation Action) and the condition (the second condition) for performing the execution for the handover (Execute Action).

To be more precise, as shown in FIG. 5, the condition setting request (Link_Configure_Threshold.request) at least includes the types of the link parameters, the first thresholds (Initiate Action Threshold), the second thresholds (Execute Action Threshold), the first judgment logical formula (Initiation Action), the second judgment logical formula (Execute Action), and an interval for judgment.

The interval for judgment is information for designating an interval for judging whether or not the first judgment logical formula (Initiation Action) is satisfied and an interval for judging whether or not the second judgment logical formula (Execute Action) is satisfied.

Here, the interval for judging whether or not the first judgment logical formula is satisfied may be different from the interval for judging whether or not the second judgment logical formula is satisfied. Specifically, the interval for judgment may be designated individually for each of that for judging whether or not the first judgment logical formula is satisfied and that for judging whether or not the second judgment logical formula is satisfied.

Meanwhile, the condition setting request (Link_Configure_Threshold.request) may also include a third threshold (Rollback Action Threshold). The third threshold (Rollback Action Threshold) is a threshold for judging whether or not to cancel the preparation for the handover (Initiation Action). Here, in order to have a hysteresis, the third threshold is preferably set to a value representing a situation where the radio environment is better than that of the first threshold (Initiate Action Threshold).

Here, it is to be noted that, in the related art, the first judgment logical formula (Initiation Action), the second judgment logical formula (Execute Action), and the interval for judgment are not included in the Link_Configure_Threshold.request.

In step 12, the MIH function unit 13 notifies the link controller 12A of the condition setting request (Link_Configure_Threshold.request) received from the MIH user 14.

In step 13, the link controller 12A notifies the MIH function unit 13 of Link_Configure_Threshold.confirm indicating that the setup of the condition is completed.

In step 14, the MIH function unit 13 notifies the MIH user 14 of Link_Configure_Threshold.confirm received from the link controller 12A.

In step 15, the link controller 12A monitors whether or not the link parameter values in the radio link established with the first network 100 become worse than the first thresholds designated by the MIH user 14. Subsequently, the link controller 12A judges whether or not the link parameter values satisfy the first judgment logical formula. Here, the explanation will be continued based on the assumption that the first judgment logical value is satisfied.

In step 16, the link controller 12A notifies the MIH function unit 13 of Link_Parameters_Report.indication indicating the link parameter values set for the radio link established with the first network 100.

To be more precise, as shown in FIG. 6, the Link_Parameters_Report.indication includes old link parameter values, new link parameter values, the operation type, and the judgment logical formula.

The old link parameter values are the values notified to the MIH function unit 13 in a previous session, while the new link parameter values are the values to be notified to the MIH function unit 13 in a current session. The operation type is the information indicating any of the preparation for the handover (Initiation Action) and the execution for the handover (Execute Action). The judgment logical formula is the information indicating any of the first judgment logical formula (Initiation Action) and the second judgment logical formula (Execute Action).

Here, it is to be noted that, in the related art, the operation type and the judgment logical formula are the information not included in the Link_Parameters_Report.indication.

Note that, in step 16, the preparation for the handover (Initiation Action) is set for the operation type and the first judgment logical formula (Initiation Action) is set for the judgment logical formula.

In step 17, the MIH function unit 13 notifies the MIH user 14 of MIH_Link_Parameters_Report.indication indicating the link parameter values set for the radio link established with the first network 100.

In step 18, the MIH user 14 notifies the MIH function unit 13 of MIH_Handover_Prepare.request that requests the preparation for the handover (Initiation Action).

In step 19, the MIH function unit 13 notifies the link controller 12B of Link_Up.request that requests an establishment of the radio link with the second network 200.

In step 20, the link controller 12B establishes the radio link with the second network 200. Here, it is needless to say that the radio communication unit 11B establishes the physical radio connection with the second network 200 prior to the establishment of the radio link.

In step 21, the link controller 12B notifies the MIH function unit 13 of Link_Up.indication indicating that the radio link has been established with the second network 200.

In step 22, the MIH function unit 13 notifies the MIH user 14 of MIH_Handover_Prepare.confirm indicating that the preparation for the handover (Initiation Action) is completed.

In step 23, the link controller 12A monitors whether or not the link parameter values set for the radio link established with the first network 100 become worse than the second thresholds designated by the MIH function unit 13. Subsequently, the link controller 12A judges whether or not the link parameter values satisfy the second judgment logical formula. Here, the explanation will be continued on the assumption that the second judgment logical formula is satisfied.

In step 24, the link controller 12A notifies the MIH function unit 13 of the Link_Parameters_Report.indication indicating the link parameter values set for the radio link established with the first network 100. Here, the Link_Parameters_Report.indication is similar to the information transmitted in step 16 described above.

Here, in step 24, the execution for the handover (Execute Action) is set for the operation type and the second judgment logical formula (Execute Action) is set for the judgment logical formula.

In step 25, the MIH function unit 13 notifies the MIH user 14 of the Link_Parameters_Report.indication indicating the link parameter values set for the radio link established with the first network 100.

In step 26, the MIH user 14 notifies the MIH function unit 13 of MIH_Switch which indicates switching of the networks to which the own terminal is connected.

In step 27, the MIH function unit 13 switches the networks to which the own terminal is connected from the first network 100 to the second network 200.

In step 28, the MIH function unit 13 notifies the MIH user 14 of MIH_Handover_Commit.request for confirming whether or not to complete the handover.

In step 29, the MIH user 14 notifies the MIH function unit 13 of MIH_Handover_Complete.request requesting completion of the handover.

In step 30, the MIH function unit 13 notifies the link controller 12A of Link_Teardown.Request requesting release of the radio link established with the first network 100.

In step 31, the link controller 12A releases the radio link established with the first network 100.

In step 32, the link controller 12A notifies the MIH function unit 13 of the Link_Parameters_Report.indication indicating completion of the release of the radio link established with the first network 100.

In step 33, the MIH function unit 13 notifies the MIH user 14 of MIH_Handover_Complete.response indicating completion of the handover.

(Operation and Effect)

According to the embodiment, the MIH user 14 notifies the MIH function unit 13 of the Link_Configure_Threshold.request including the first judgment logical formula and the second judgment logical formula each indicating a combination of the thresholds to be satisfied by the respective multiple link parameters. The MIH function unit 13 notifies the link controller 12 of the Link_Configure_Threshold.request received from the MIH user 14.

Therefore, the link controller 12 does not have to notify the MIH function unit 13 of the information indicating the link parameter values every time any of the individual link parameters exceed the corresponding threshold. This reduces messages sent from the link controller 12 to the MIH function unit 13.

Moreover, since the link controller 12 knows the combinations of the thresholds to be satisfied by the respective multiple link parameters, it is possible to perform a handover operation properly without depending upon transmission timing of the information indicating the link parameter values and thereby to prevent erroneous judgment of handovers.

Meanwhile, when a radio communication system employs different communication schemes for uplink and downlink, the capability of the transmitter side varies (between transmission from a radio base station and transmission from a radio terminal). Accordingly, it is not deemed preferable to judge everything based solely on a single link parameter and a single threshold. This is why the judgment is performed by use of the thresholds and the judgment logical formula. As described in this embodiment, it is possible to perform proper judgments accurately by the judgment based on the combinations of the thresholds for the multiple link parameters and the judgment logical formula.

[Other Embodiments]

As described above, the contents of the present invention have been described through an embodiment of the present invention. However, it is to be understood that the description and the drawings constituting part of this disclosure will not limit the present invention. It is obvious to those skilled in the art that various alternative embodiments are possible from this disclosure.

Although there are not specific remarks in the above-described embodiment, all or part of the radio communication units 11 maybe configured detachable from the radio terminal 10. Similarly, all or part of the link controllers 12 maybe configured detachable from the radio terminal 10 together with the radio communication units 11.

Here, a device having a configuration in which the radio communication units 11 have been detached from the radio terminal 10 will be referred to as an information processing device. Similarly, a device having a configuration in which the radio communication units 11 and the link controllers 12 have been detached from the radio terminal 10 will be referred to as an information processing device.

The operations of the ratio terminal 10 (or the information processing device) can also be provided as a program executable by a computer.

The above-described embodiment has explained the operation of a handover from the first network 100 to the second network 200 as the example. However, the present invention is not limited to this. The present invention is applicable to an operation of a handover between multiple networks employing different radio communication schemes.

In the above-mentioned embodiment, the application processor 15 and the MIH user 14 are provided separately from each other; however, the application processor 15 and the MIH user 14 maybe provided integrally with each other. In this case, the mobility manager is formed of the application processor 15 and the MIH user 14.

Additionally, in the above-mentioned embodiment, one MIH user 14 is provided; however, multiple MIH users 14 may be provided.

As described above, it is needless to say that the present invention encompasses various embodiments which are not described herein. It is therefore to be understood that the technical scope of the present invention should be defined solely by the matters to define the invention in accordance with the appended claims which are deemed appropriate from the above description.

INDUSTRIAL APPLICABILITY

As described above, a radio terminal, an information processing device, an information processing program, and an information processing method according to the present invention are capable of reducing messages sent from a link controller to a handover controller and of preventing erroneous judgment of handovers, and are therefore useful in radio communication such as mobile communication.

The invention claimed is:

1. A radio terminal configured to perform a handover from a first network to a second network employing a radio communication scheme different from that of the first network, the radio terminal comprising:
   a first link controller configured to establish a radio link with the first network; a second link controller configured to establish a radio link with the second network; and
   a handover controller configured to control the handover from the first network to the second network, wherein
   the handover controller notifies the first link controller of a condition setting request including a plurality of first thresholds and a first logical formula to start an establishment of a radio link with the second network and a plurality of second thresholds and a second logical formula to execute a handover from the first network to the second network,
   the first logical formula comprising a combination of the first thresholds to be satisfied by a plurality of respective link parameters in the radio link established with the first network, wherein the first link controller uses the first logical formula to notify the handover controller when the link parameters in the radio link become worse than the first thresholds, and
   the second logical formula comprising a combination of the second thresholds to be satisfied by the plurality of respective link parameters in the radio link established with the first network, wherein the first link controller uses the second logical formula to notify the handover controller when the link parameters in the radio link become worse than the second thresholds.

2. The radio terminal according to claim 1, wherein the condition setting request includes:
   an interval for judging whether or not the first logical formula is satisfied; and
   an interval for judging whether or not the second logical formula is satisfied.

3. The radio terminal according to claim 1, wherein the condition setting request further includes a third threshold for judging whether to cancel the handover after establishing the radio link with the second network.

4. An information processing device comprising:
   a handover controller configured to control a handover from a first network to a second network, wherein
   the handover controller notifies a first link controller configured to establish a radio link with the first network of a condition setting request including a plurality of first thresholds and a first logical formula to start an establishment of a radio link with the second network and a plurality of second thresholds and a second logical formula to execute a handover from the first network to the second network,
   the first logical formula comprising a combination of the first thresholds to be satisfied by a plurality of respective link parameters in the radio link established with the first network, wherein the first link controller uses the first logical formula to notify the handover controller when the link parameters in the radio link become worse than the first thresholds, and the second logical formula comprising a combination of the second thresholds to be satisfied by the plurality of respective link parameters in the radio link established with the first network, wherein the first link controller uses the second logical formula to notify the handover controller when the link parameters in the radio link become worse than the second thresholds.

5. A non-transitory computer readable medium comprising an information processing program to be applied to an information processing apparatus including a mobility manager configured to manage mobility from a first network to a second network employing a radio communication scheme different from that of the first network, and a handover controller configured to control a handover from the first network to the second network, the program causing a computer to execute the step of:

notifying, from the handover controller to a first link controller configured to establish a radio link with the first network, of a condition setting request including a plurality of first thresholds and a first logical formula to start an establishment of a radio link with the second network and a plurality of second thresholds and a second logical formula to execute a handover from the first network to the second network, wherein the first logical formula comprising a combination of the first thresholds to be satisfied by a plurality of respective link parameters in the radio link established with the first network, wherein the first link controller uses the first logical formula to notify the handover controller when the link parameters in the radio link become worse than the first thresholds, and the second logical formula comprising a combination of the second thresholds to be satisfied by the plurality of respective link parameters in the radio link established with the first network, wherein the first link controller uses the second logical formula to notify the handover controller when the link parameters in the radio link become worse than the second thresholds.

6. An information processing method used in an information processing device including an MIH user configured to manage mobility from a first network to a second network employing a radio communication scheme different from that of the first network, and an MIH function unit configured to control a handover from the first network to the second network, the information processing method comprising the step of:

notifying, from the MIH function unit to a first link controller configured to establish a radio link with the first network, of a Link_Configure_Threshold.request including a plurality of first thresholds and a first logical formula to start an establishment of a radio link with the second network and a plurality of second thresholds and a second logical formula to execute a handover from the first network to the second network, wherein the first logical formula comprising a combination of the first thresholds to be satisfied by a plurality of respective link parameters in the radio link established with the first network, wherein the first link controller uses the first logical formula to notify the handover controller when the link parameter parameters in the radio link become worse than the first thresholds, and the second logical formula comprising a combination of the second thresholds to be satisfied by the plurality of respective link parameters in the radio link established with the first network, wherein the first link controller uses the second logical formula to notify the handover controller when the link parameters in the radio link become worse than the second thresholds.

* * * * *